United States Patent [19]

Komonko

[11] Patent Number: 4,727,462
[45] Date of Patent: Feb. 23, 1988

[54] CLAMP-ON MAGNET FOR TROUBLE LAMPS

[76] Inventor: James R. Komonko, P.O. Box 2830, Sitka, Ak. 99835

[21] Appl. No.: 36,312

[22] Filed: Apr. 9, 1987

[51] Int. Cl.[4] .......................................... F21L 15/18
[52] U.S. Cl. ................................... 362/398; 362/226; 248/206.5
[58] Field of Search ............... 362/398, 430, 387, 269, 362/287, 226; 248/206.5

[56] References Cited

U.S. PATENT DOCUMENTS

| | | | |
|---|---|---|---|
| 1,561,555 | 11/1925 | Little | 362/398 |
| 1,603,171 | 10/1926 | Wade | 362/398 |
| 1,932,143 | 10/1933 | Piercy | 362/398 |
| 2,747,079 | 5/1956 | Kubiliunas | 362/398 |
| 4,019,047 | 4/1977 | Frey | 248/206.5 |
| 4,533,982 | 8/1985 | Kozar | 362/398 |
| 4,672,515 | 6/1987 | Baker | 362/398 |

FOREIGN PATENT DOCUMENTS 1039703  10/1978  Canada ............................. 362/387

Primary Examiner—E. Rollins Cross
Attorney, Agent, or Firm—Henderson & Sturm

[57] ABSTRACT

A clamp-on magnet for trouble lamps of a type which have a shield on one side of an electric bulb. A magnet is connected to a housing and the housing has a pair of spaced apart parallel flanges extending therefrom. Each of the flanges has a hole extending therethrough. A pair of wire clamps having helical central portions and a pair of arms extending from each end of the helical central portion are pivotally attached by fasteners to the holes in the parallel flanges. These spring clamps have hooks on the end thereof so that the arms of the spring clamp can be pulled apart to extend over the shield of the trouble lamp and are biased back into tight engagement with the shield to hold the magnet to the trouble lamp. When the magnet is in use by placing it against a metal surface, such as that of an automobile, the trouble lamp can be pivoted through approximately 250° and held in any position in between so that the light from the trouble lamp can be directed to where it is needed.

1 Claim, 5 Drawing Figures

CLAMP-ON MAGNET FOR TROUBLE LAMPS

TECHNICAL FIELD

The present invention relates generally to a clamp-on magnet for trouble lamps and more particularly to such an apparatus which will quickly and easily attach to a trouble lamp and which allows the direction of the light to be easily adjusted.

BACKGROUND ART

Trouble lamps, or drop lights as they are often called, are commonly used to provide light on a temporary basis to a place where light is not always needed. For example, automobile mechanics commonly use these kinds of lamps to direct the light to that portion of a vehicle upon which they are working.

U.S. Pat. No. 1,561,554 to Little shows a magnetic attachment to a trouble lamp so that the trouble lamp can be held against a metallic surface, such as a car. A problem with this early magnetic attachment is that the light cannot be easily adjusted to direct the light where needed.

U.S. Pat. No. 1,603,171 to Wade shows an electromagnetic structure attached to a trouble light. This apparatus also lacks the ability to easily and quickly adjust the direction of the light from the trouble lamp. U.S. Pat. No. 1,932,143 to Piercy shows a clamp with threaded fasteners for attachment to a trouble lamp. While the direction of the light from the trouble lamp can be adjusted, threaded fasteners must be used to attach the apparatus to a trouble lamp and, of course, these fasteners must be removed if it is desired to use the magnet attachment on a different trouble lamp. U.S. Pat. No. 4,019,047 to Frey is similar to the aforementioned Little patent because it has a magnet, but the trouble light cannot be easily adjusted to direct the light in a particular direction with this Frey structure.

Accordingly, there is a need for a magnet attachment to a trouble light to overcome the aforementioned problems.

DISCLOSURE OF THE INVENTION

The present invention relates to a clamp-on magnet for trouble lamps of a type which have a shield on one side of an electric bulb. A magnet is connected to a housing and the housing has a pair of spaced apart parallel flanges extending therefrom. Each of the flanges has a hole extending therethrough. A pair of wire clamps having helical central portions and a pair of arms extending from each end of the helical central portion are pivotally attached by fasteners to the holes in the parallel flanges. These spring clamps have hooks on the end thereof so that the arms of the spring clamp can be pulled apart to extend over the shield of the trouble lamp and are biased back into tight engagement with the shield to hold the magnet to the trouble lamp. When the magnet is in use by placing it against a metal surface, such as that of an automobile, the trouble lamp can be pivoted through approximately 250° and held in any position in between so that the light from the trouble lamp can be directed to where it is needed.

An object of the present invention is to provide an improved clamp-on magnet for trouble lamps.

Another object of the present invention is to provide a clamp-on magnet for trouble lights which is easy to install or remove from a trouble lamp.

A further object of the present invention is to provide a clamp-on magnet for trouble lamps which allows the trouble lamp to be adjusted through approximately 250° while the magnet is attached to a metallic surface.

Other objects, advantages, novel features of the present invention will become apparent from the following detailed description of the invention when considered in conjunction with the accompanying drawings.

BEST MODE FOR CARRYING OUT THE INVENTION

Figures 1, 2:
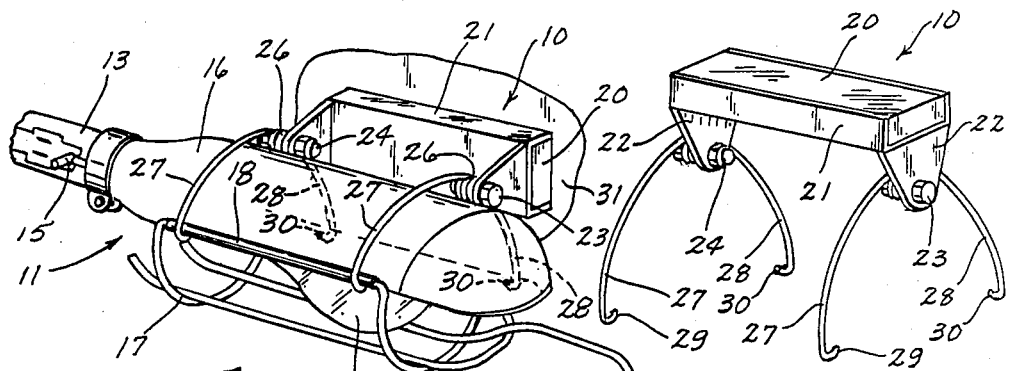
FIG. 1 is a perspective view of a trouble lamp having a preferred embodiment of the present invention attached thereto as shown in use.
FIG. 2 is a perspective view of a preferred embodiment of the present invention.
Figures 3, 4:
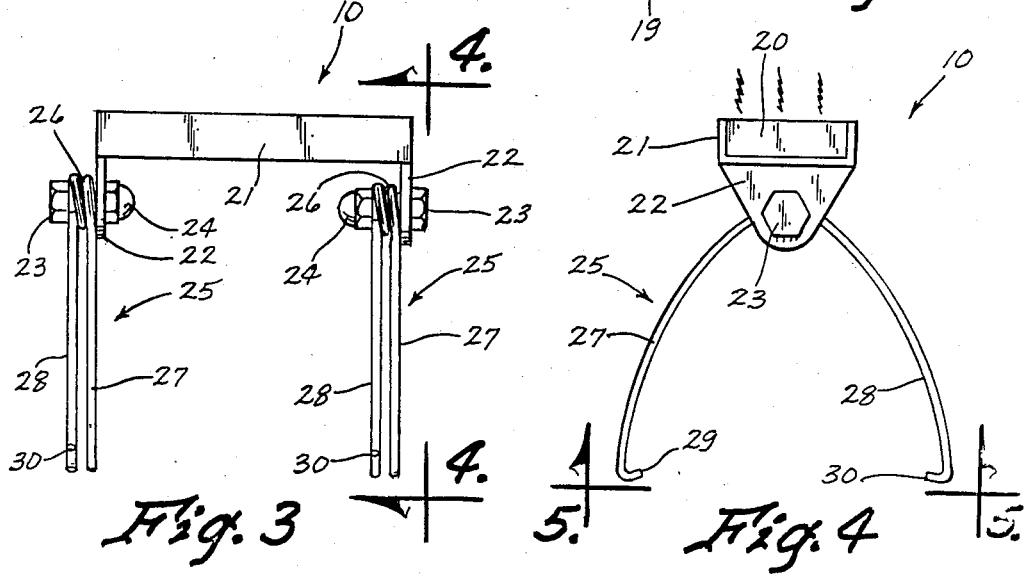
FIG. 3 is a side elevational view of the preferred embodiment as shown in FIGS. 1 and 2.
FIG. 4 is a view taken along line 3—3 of FIG. 3.
Figure 5:
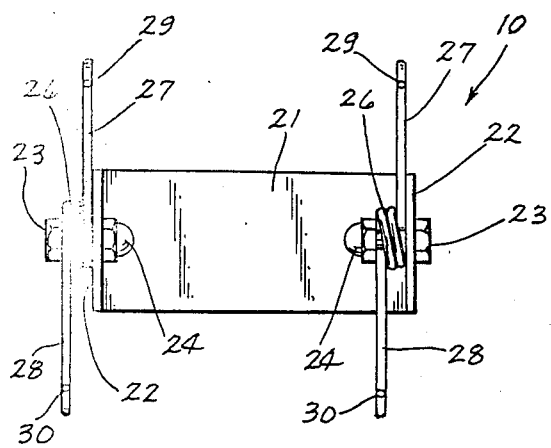
FIG. 5 is a view taken along line 5—5 of FIG. 4.

Referring now to the drawings wherein like reference numerals designate identical or corresponding parts throughout the several views, FIG. 2 shows an apparatus (10) constructed in accordance with the present invention and FIG. 1 shows this apparatus (10) connected to a trouble lamp.

A typical trouble lamp includes a socket portion (13) for receiving a light bulb (14) and has a push switch (15) thereon for turning the light bulb (14) on and off. A long flexible outlet cord (not shown) is connected to a trouble lamp (11). The trouble lamp (11) also includes a metal shield (16) and a wire screen (17) which normally pivots about a hinge (18) so that the bulb (14) can be removed and replaced when it is burned out. A hook (19) is typically provided to allow the user to hang the trouble lamp (11) on something to help direct the light from the bulb (14) to where it is needed.

Referring again to FIG. 2, it is noted that a magnet (20) is attached inside a housing (21). If the housing (21) is made of a ferrous material, then the magnet (20) will stay inside the housing without glue or fasteners, otherwise something needs to be provided to attach the magnet (20) to the housing (21). A pair of parallel flanges (22) are attached to the housing (21) and have a pair of holes therethrough through which bolts (23) are extended. The bolts (23) have threaded acorn nuts (24) threadably attached to the other side thereof. These bolts (23) extend through a helical portion (26) of wire spring steel clamps (25).

These spring steel clamps (25) include a pair of arms (27) and (28) which have hooks (29) and (30) on the ends thereof. The hooks (29) and (30) connect the spring steel clamps (25) to the housing shield (16). The magnet (20) can be secured to a metallic surface (31), which can be, for example, the metal body of an automobile or the like (See FIG. 1). Then the shield (16) can be grasped and turned so as to direct the light from the bulb (14) in any direction through about 250° as desired. Once adjusted, it will stay in that position if the tension is properly adjusted on the nut and bolt fasteners (23) and (24). It is frictional engagement which holds the trouble light (11) in the position to which it is adjusted.

When it is desired to use the trouble lamp (11) in a different location, the apparatus shown in FIG. 1 is merely pulled off of the metal (31) and placed onto another metal surface, whereupon the angle of the clamps (25) can be adjusted again by pivoting as discussed above.

When the clamp-on magnet attachment (10) is no longer needed, it can easily be removed by pulling the arms (27) and (28) of the spring clamp (25) apart and removing it from the shield (16). It can be reattached at a different time, or to a different trouble lamp if desired.

Accordingly it will be appreciated that the preferred embodiment (10) does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. Apparatus for connection to a trouble light of a type having a light bulb having a shield extending around one side thereof, said apparatus comprising:

a magnet;

a housing connected to said magnet;

a pair of spaced apart parallel flanges extending from said housing, each flange having a hole therein;

a first wire spring clamp having a helical central portion with a longitudinal axis, and a pair of arms, one extending from each end of said helical central portion, each of said arms having a hook on each end thereof for selectively extending around said shield, said arms being biased to a first position wherein they are less than 90 degrees apart and being relatively movable to a second position wherein the arms are further apart than they are in the first position thereof;

means extending through the hole in one of the flanges for pivotally attaching said first wire spring clamp to said one of the flanges along the longitudinal axis of said helical central portion of said first spring clamp;

a second wire spring clamp substantially identical to said first wire spring clamp; and means extending through the hole in the other one of the flanges for pivotally attaching said second wire spring clamp to said other one of the flanges along said longitudinal axis whereby the arms of the first and second wire spring clamps can be placed around the shield of the trouble light while at the same time permitting the magnet to be pivoted with respect to the trouble light so that the direction of the light can be adjusted.

* * * * *